US009849889B2

(12) United States Patent
Darnell et al.

(10) Patent No.: US 9,849,889 B2
(45) Date of Patent: Dec. 26, 2017

(54) ADAPTIVE CONTROL OF MOTOR VEHICLE POWERTRAIN

(71) Applicant: Jaguar Land Rover Limited, Whitley, Coventry, Warwickshire (GB)

(72) Inventors: Paul Darnell, Royal Leamington Spa (GB); Elliot Hemes, Solihull (GB); Mark Roberts, Bromsgrove (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/374,420

(22) PCT Filed: Jan. 25, 2013

(86) PCT No.: PCT/EP2013/051442
§ 371 (c)(1),
(2) Date: Jul. 24, 2014

(87) PCT Pub. No.: WO2013/110761
PCT Pub. Date: Aug. 1, 2013

(65) Prior Publication Data
US 2014/0372012 A1    Dec. 18, 2014

(30) Foreign Application Priority Data

Jan. 25, 2012  (GB) .................................. 1201203.5

(51) Int. Cl.
*B60W 50/10* (2012.01)
*F02D 11/10* (2006.01)
(Continued)

(52) U.S. Cl.
CPC ............ *B60W 50/10* (2013.01); *B60K 26/04* (2013.01); *B60W 50/12* (2013.01); *F02D 11/10* (2013.01);
(Continued)

(58) Field of Classification Search
CPC ............ F02D 2250/18; F02D 2250/21; F02D 11/105; F02D 41/1497; F02D 41/021;
(Continued)

(56) References Cited

U.S. PATENT DOCUMENTS 5,182,710 A * 1/1993 Tomisawa ............... F16H 59/00
477/143
5,265,570 A * 11/1993 Schnaibel ............. F02D 11/105
123/339.24
(Continued)

FOREIGN PATENT DOCUMENTS

EP    2055546 A1    5/2009
JP    S6125938 A    2/1986
(Continued)

OTHER PUBLICATIONS

International Search Report for application No. PCT/EP2013/051442, dated May 7, 2013, 3 pages.
(Continued)

*Primary Examiner* — Sizo Vilakazi
(74) *Attorney, Agent, or Firm* — Reising Ethington P.C.

(57) ABSTRACT

Embodiments of the present invention provide a vehicle having different operating modes, and for each such mode a different characteristic of output torque and accelerator pedal position. The rise of output torque in response to a propulsion request is more or less delayed according to the instant operating mode. The invention provides for blending of the response to a propulsion request so that the delay is progressively varied between a source and target operating mode.

19 Claims, 5 Drawing Sheets

(51) Int. Cl.
  *F02D 41/02* (2006.01)
  *F02D 41/24* (2006.01)
  *B60K 26/04* (2006.01)
  *B60W 50/12* (2012.01)
  *B60W 50/00* (2006.01)
  *F02D 41/14* (2006.01)

(52) U.S. Cl.
  CPC .......... *F02D 11/105* (2013.01); *F02D 41/021* (2013.01); *F02D 41/2422* (2013.01); *B60W 2050/0014* (2013.01); *B60W 2050/0026* (2013.01); *B60W 2050/0042* (2013.01); *B60W 2050/0052* (2013.01); *B60W 2540/10* (2013.01); *B60W 2540/106* (2013.01); *B60W 2710/0605* (2013.01); *B60W 2710/0666* (2013.01); *F02D 2041/1422* (2013.01); *F02D 2041/1432* (2013.01); *F02D 2200/702* (2013.01)

(58) Field of Classification Search
  CPC ................. F02D 41/2422; F02D 11/10; F02D 2041/1422; F02D 2041/1432; B60W 50/10; B60W 50/12; B60W 2050/0014; B60W 2050/0026; B60W 2050/0042; B60W 2050/0052; B60W 2540/10; B60W 2710/0605; B60W 2710/0666; B60K 26/04
  USPC ............ 123/406.23; 701/102, 103, 104, 105, 701/110, 115
  See application file for complete search history.

(56) References Cited

U.S. PATENT DOCUMENTS

| | | | |
|---|---|---|---|
| 5,775,293 | A | 7/1998 | Kresse |
| 6,044,318 | A * | 3/2000 | Bourdon ............. F02D 41/2422 123/399 |
| 6,418,907 | B1 * | 7/2002 | Frech .................. B60W 30/188 123/325 |
| 2005/0014606 | A1 | 1/2005 | Duty et al. |
| 2007/0271026 | A1 * | 11/2007 | Hijikata ................ F02D 11/105 701/103 |
| 2008/0300768 | A1 * | 12/2008 | Hijikata ................ F02D 11/105 701/102 |
| 2009/0192014 | A1 | 7/2009 | Tiwari et al. |
| 2011/0032075 | A1 | 2/2011 | Alrabady et al. |

FOREIGN PATENT DOCUMENTS

| | | |
|---|---|---|
| JP | 2007315202 A | 12/2007 |
| JP | 2008232110 A | 10/2008 |

OTHER PUBLICATIONS

Great Britain Search Report for application No. GB1201203.5, dated May 25, 2012, 5 pages.
Japanese Office Action in Japanese with English summary, corresponding with Japanese application No. 2014-553732, dated May 31, 2016, 5 pages.

* cited by examiner

ADAPTIVE CONTROL OF MOTOR VEHICLE POWERTRAIN

FIELD OF THE INVENTION

Embodiments of the present invention relate to adaptive control of a powertrain of a motor vehicle. In particular, embodiments of the present invention relate to adaptive control of a source of motive power, for example an internal combustion engine and in particular, but not exclusively, to the response of the engine to an operator command in consequence of a change of engine operating mode. The change of engine operating mode may in turn be related to a change of operating mode of a vehicle in which the engine is installed, for example an operating mode related to the terrain under a vehicle. Aspects of the invention relate to a system, to a method and to a vehicle.

BACKGROUND

Internal combustion engines of vehicles may have operating modes which may be selectable by the driver. Thus in some vehicles an economy mode, a normal mode and a sport mode may be provided, each mode having a different engine response to one or more commands of the driver. Typically the engine may respond differently in each mode to a given input of the accelerator pedal, being least responsive in economy mode, and most responsive in sport mode. In this way driveability of the vehicle can be improved by providing a range of accelerator pedal movements which are appropriate to, for example, the desired output torque characteristic of the engine. Such a system necessarily relies upon an electronic input from the vehicle driver, for example an accelerator potentiometer providing an input signal to an electronic control unit having a plurality of accelerator pedal position/output torque maps, as will be further described. The maps may also be referred to as or accelerator pedal progression maps or pedal progression maps.

Another kind of operating mode relates to the terrain which a vehicle is intended to cross. U.S. Pat. No. 7,349,776, the content of which is hereby incorporated by reference, describes a vehicle control system in which the driver can implement improved control over a broad range of driving conditions, and in particular over a number of different terrains which may be encountered when driving off-road. In response to a driver input command relating to the terrain, the vehicle control system is selected to operate in one of a number of different driving modes including one or more terrain response (TR) modes. For each TR mode, the various vehicle subsystems are operated in a manner appropriate to the corresponding terrain.

In one arrangement, a mode (for example a winter mode) is available in which the vehicle is configured to launch from standstill in a forward gear other than first gear such as a second gear to reduce risk of excessive wheel slip. Different modes may have different accelerator pedal maps (amount of engine torque developed for a given accelerator pedal position), torque delivery (accelerator pedal maps in combination with a rate at which engagement of transmission clutches is controlled to take place thereby determining how aggressively gear shifts take place), and transmission shift points as a function of coefficient of surface friction. For example, in one or more TR modes the transmission shift points may be arranged wherein gear shifts take place at lower speeds than they might otherwise take place at, and in a more gentle manner (e.g. at a slower rate).

Thus one or more accelerator pedal position/engine torque maps appropriate to the terrain may be selectable by the driver. For example when driving in rocky terrain, a high torque output may be indicated for a small accelerator movement, thus giving immediate urge to overcome a rock step. In contrast on sand, a lower torque output may be indicated for the same accelerator movement, so as to avoid spinning a vehicle wheel and digging a hole. To some extent the selected torque map may be a matter of judgement related to the available grip on the terrain.

Figure 1:
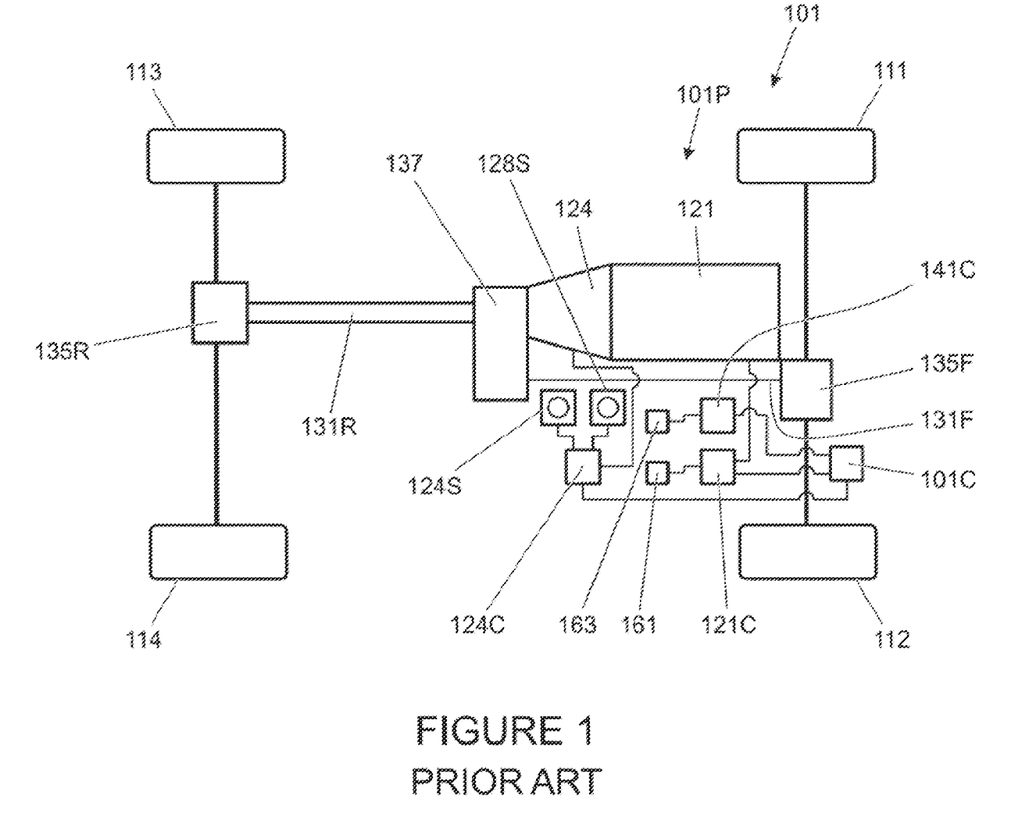
FIG. 1 is a schematic illustration of a known motor vehicle.

FIG. 1 shows a known motor vehicle 101 having a powertrain 101P. The powertrain 101P includes an engine 121, a transmission 124, a power take-off unit (PTU) 137, a rear driveshaft or propshaft 131R and a front driveshaft or propshaft 131F. The rear driveshaft 131R is operable to drive a pair of rear wheels 113, 114 via a rear differential 135R whilst the front driveshaft 131F is operable to drive a pair of front wheels 111, 112 via a front differential 135F.

The vehicle 101 has an engine controller 121C arranged to receive an accelerator pedal position signal from an accelerator pedal 161 and a brakes controller 141C operable to receive a brake pedal position signal from a brake pedal 163.

In the configuration of FIG. 1 the transmission 124 is releasably connectable to the rear driveshaft 131R by means of the PTU 137, allowing selectable two wheel drive or four wheel drive operation.

The PTU 137 is also operable in a 'high ratio' or a 'low ratio' configuration, in which a gear ratio between an input shaft and an output shaft thereof is selected to be a high or low ratio.

The high ratio configuration is suitable for general on-road or 'on-highway' operations whilst the low ratio configuration is more suitable for negotiating certain off-road terrain conditions and other low speed applications such as towing.

The vehicle 101 has a central controller 101C, referred to as a vehicle control unit (VCU) 101C. The VCU 101C receives and outputs a plurality of signals to and from various sensors and subsystems provided on the vehicle 101.

The vehicle 101 has a transmission mode selector dial 124S operable to select a required operating mode of the transmission 124. The selector dial 124S provides a control signal to a transmission controller 124C which in turn controls the transmission 124 to operate according to the selected mode. Available modes include a park mode, a reverse mode and a drive mode.

The vehicle 101 also has a terrain response mode selector dial 128S. The terrain response mode selector dial 128S is operable by a driver to select a required terrain response mode of operation of the vehicle.

It is to be understood that if a user selects the drive mode of the transmission 124, the engine controller 121C employs a drive mode accelerator pedal progression map to determine the amount of drive torque T that the engine 121 should produce as a function of accelerator pedal position P. If the user selects a 'dynamic' TR mode, the engine controller 121C employs a sport mode accelerator (or throttle) pedal progression map instead of the drive mode accelerator pedal progression map. The accelerator pedal progression maps differ in that the sport mode map is arranged to provide a more aggressive response by the engine 121C to a given initial advance (such as depression) of the accelerator pedal 161.

Different accelerator pedal progression map are also employed for different respective user-selectable terrain response modes.

As noted above, in some arrangements the vehicle may be operable automatically to select an appropriate TR mode for the prevailing driving conditions.

Figure 2:
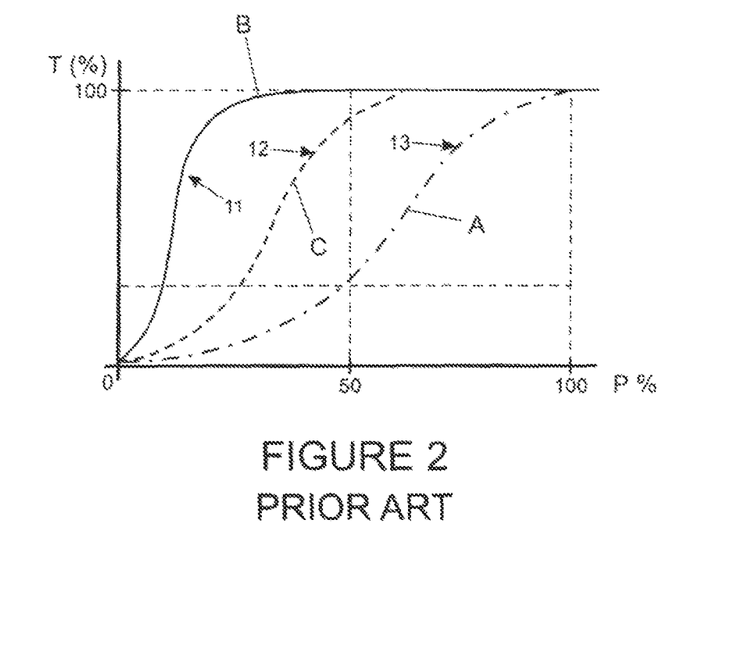
FIG. 2 is an illustration of engine torque maps of different modes of vehicle operation, showing engine output torque as a function of accelerator pedal position.

FIG. 2 shows two different accelerator pedal progression maps in the form of a plot of engine torque output T as a function of accelerator pedal position P on a scale from 0 (foot off) to 100% of full scale depression of the accelerator pedal 161. Two extreme vehicle operating modes A and B are illustrated. Mode A is an initially cautious accelerator pedal progression map (torque map) and may correspond for example to a TR mode suitable for use when driving over sand. Mode B is an initially more aggressive torque map and may correspond to a TR mode suitable for use when driving over rock. A driver may select operation according to mode A or mode B my means of the TR mode selector dial 128S. In some vehicles different torque maps may be selected automatically by the VCU 101C.

The response of the vehicle engine 121 to driver demand may be filtered to improve vehicle performance and to assist the driver to deliver abrupt or smooth acceleration and deceleration depending on the prevailing conditions. Thus a propulsion request may give a more or less immediate rise in torque T from the vehicle engine 121 according to an operating characteristic which is a function of vehicle operating mode.

A negative propulsion request (for example foot-off) may likewise give a more or less immediate reduction in engine output torque T. Thus for example, an engine response will be more immediate on a rock surface than on a sand surface. In this specification the term 'propulsion request' indicates a change of accelerator position P and includes both the positive propulsion request (increasing engine speed/torque) and the negative propulsion request (reducing engine speed/torque). By way of example, when driving on rocky terrain, on release of the accelerator pedal the torque may be reduced relatively quickly (and as possible in some embodiments) so as to minimise the chance of cresting an obstacle too quickly. Conversely on sand, it may be preferable to reduce the torque more slowly when the accelerator pedal is released. This is because high engine drag upon release of the accelerator pedal may cause one or more wheels of the vehicle to sink into the sand, making subsequent vehicle launch more difficult.

A propulsion request may comprise a movement of the accelerator pedal 161 from a zero accelerator position (foot-off) or may comprise a further movement from a non-zero position. Typically the position of the accelerator pedal P is continually sampled at a suitable frequency, and any change of position P may indicate a new propulsion request (positive or negative) to which the vehicle engine 121 is commanded to respond according to the selected map of accelerator pedal position P as a function of engine torque T.

In the alternative, a pedal progression map may relate accelerator pedal position P to an analogue of engine output torque, such as one or more of drive torque at the vehicle wheels, power output, another measure of tractive effort, fuel flow, air flow or any measurable indicator that varies according to a accelerator pedal progression and engine output torque. The engine output torque may represent the output of other forms of motive power, such as an electric motor, or an analogue thereof, such as motor current.

Many suitable analogues are known, so that whilst engine output torque is a convenient direct indicator, the use of one or more analogues to define the changing pedal progression characteristic is not excluded.

Furthermore accelerator pedal position P is typically converted into an electrical signal for use in a processor which commands an engine output torque according to the selected pedal progression map. The relationship between pedal position P and the electrical signal is defined by a characteristic, which may be linear so that the electrical signal changes proportionately to the increasing advancement of an accelerator pedal 161. The electrical signal is typically a voltage and the form of the electrical signal as a function of pedal position P will be termed the pedal signal map in this specification.

In the example of FIG. 2, it can be seen that at 50% pedal advance P, the solid line characteristic (11) corresponding to mode B shows the engine 121 developing about 100% torque T, whereas the chain-dot line (13) corresponding to mode A shows only about 25% of maximum torque. In the latter case 100% torque is provided only at 100% advancement of the accelerator pedal 161. The dashed line (12) is an intermediate characteristic C. The characteristic of mode A is typical for a soft terrain such as sand, whereas the characteristic of mode B is typical of a hard terrain such as rock.

Techniques are known for blending from one accelerator pedal progression map to another over time, so that the vehicle driver is not presented with a step change in engine output torque T as the mode changes instantaneously. This avoids for example an immediate increase in engine torque T from 25% to 100% of maximum torque at the 50% accelerator position P when the VCU 101C switches from mode A to mode B, i.e. from characteristic (13) to characteristic (11). A blend may take up to 20 seconds to complete.

Figure 3:
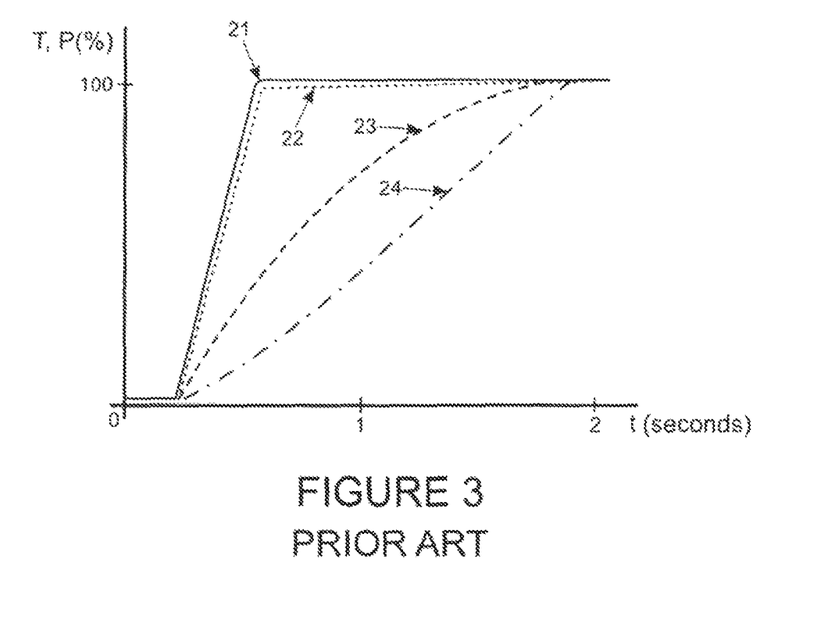
FIG. 3 is an illustration of filtered output torque response T of an engine to a change of accelerator pedal position P as a function of time.

FIG. 3 illustrates a known filter whereby a driver propulsion request is modified according to terrain conditions, so that an increase in engine torque T from zero is more rapid or less rapid in reaching the target output torque of the engine 121, as indicated by the selected pedal progression map. It is to be understood that by the term filter is meant that the driver propulsion request input by means of movement of the accelerator pedal P is acted on by the VCU 101C according to a characteristic that transforms an input to an output.

The filter characteristic may simply be a time-shift characteristic that delays the moment in time at which the driver propulsion request is acted on by the VCU 101C in commanding a corresponding increase (or decrease) in engine torque T. Thus, in the case the driver ramps the accelerator pedal 161 from a position P1 to a position P2 at a rate P', the torque commanded by the VCU 101C may increase from torque T1 corresponding to position P1 to torque T2 corresponding to position P2 at a rate corresponding to P', but only after a certain prescribed time period has elapsed from receipt of the signal. The time period may be settable (calibrateable) such that a manufacturer or maintenance personnel may set the value of this time period. The time period may itself be dependent on one or more parameters such as engine speed, vehicle speed, engine torque T, selected vehicle operating mode or any other suitable parameter.

Other filter characteristics may be useful in addition or instead. In practice the response of the engine 121 to generate an output according to a characteristic of FIG. 2 is more delayed or less delayed by the VCU 101C, but to the intent that target torque T is reached within a maximum period, for example about two seconds.

In FIG. 3 accelerator pedal position P is plotted against time t for a given output torque characteristic. The solid line 21 represents pedal position P, and shows a rapid advancement from minimum to maximum (100%) within a short period of time.

The dotted line 22 represents engine output torque T for one operating mode of the vehicle, where the propulsion request (pedal position P, line 21) gives an immediate engine response. This engine output torque T (line 22) closely follows the changing accelerator pedal position P, and the speed of response of the engine 121 is substantially unmodified. This operating mode is typical for a hard terrain, so that engine output torque T reaches the target torque substantially immediately as indicated by the selected pedal progression map.

The dashed line 23 represents engine output torque T according to a more filtered propulsion request for an operating mode typical for a slippery surface such as grass, gravel or snow. The unfiltered propulsion request in this example corresponds to line 21 of FIG. 3. In this case the propulsion request causes engine output torque T to rise more slowly so as to avoid spinning of the vehicle wheels 111-114. In the case of line 23, the rate of change of torque T is somewhat reduced as compared with characteristic 22.

The chain-dot line 24 of FIG. 3 represents more extreme filtering appropriate for an operating mode typical of sand, where wheel spinning may cause the vehicle 101 to dig a hole and become stuck. In this case engine torque T rises still more slowly in response to a propulsion request.

The characteristics of FIG. 3 are merely examples, and can be modified by a suitably skilled person to obtain an engine response most suitable for the vehicle 101 and the operating condition thereof. In the illustration, target output torque T may be achieved within 1-2 seconds for all characteristics although other values are also useful.

It is to be understood that the same techniques can be applied to a negative propulsion request, so that engine output torque T will fall more quickly or less quickly according to the selected pedal progression map.

In practice, all propulsion requests may cause a fitter to be applied, and the filter may be negligible (e.g. characteristic 22) or significant (e.g. characteristic 24). In the vehicle 101 of FIG. 1, characteristic 22 corresponds to a rock crawl mode whilst characteristic 24 corresponds to a sand mode.

Each characteristic is typically retained in a memory device of an engine control unit (ECU) such as engine controller 121C or VCU 101C and is automatically implemented upon selection or detection of a new vehicle operating condition.

The example described above with respect to FIG. 3 applies a filter to a pedal progression map relating accelerator pedal position P to engine output torque T. In the alternative it is also possible to apply a filter to the pedal signal map to achieve a similar (or same) effect. This detection of a new vehicle operating condition will result in the selection of an appropriately filtered pedal signal map, to the intent that engine output torque T will rise or fall at a rate appropriate to the newly detected operating condition.

If an alternative operating mode is selected by the vehicle driver, a change in the characteristic of engine response to a propulsion request is generally not a surprise—the change is in fact expected by the driver and is generally desirable. However difficulties may arise if the operating mode is automatically selected in response to a vehicle sensing a change of operating condition. Thus, for example a vehicle may include a system to detect a change of terrain from rock to sand and command the vehicle engine to adopt a different torque map. The consequent change in engine response may be disconcerting to the driver, especially if such automatic mode changes are repeated frequently.

For example, if driving on a sand terrain, the vehicle driver may become accustomed to a somewhat delayed engine response. The vehicle may automatically detect a temporary change to a hard surface, such as rock, and consequently change the operating mode of the vehicle so that the engine response is immediate.

A mode change may cause an acceleration request to be implemented more or less quickly, as described above, and may also cause a more or less instant drop in engine torque T in response to reverse movement of the accelerator pedal. A sudden drop in torque T may be obviated for certain terrain conditions.

Thus with reference to FIG. 3 a switch from the sand mode (line 24) to the rock crawl mode (line 22) one second after an acceleration request results in an immediate doubling of engine output torque T. The opposite effect may occur when the accelerator pedal is released. In the case of a switch from rock crawl mode to sand mode one second after the acceleration request, an immediate halving of engine output torque T takes place.

This change may be disconcerting, and it would be desirable to indicate to the driver that such a change is in progress; visual or audible indicators are not considered desirable because the driver may be overloaded with information, and not immediately appreciate what the indicator is indicating. Furthermore automatic mode changes may occur frequently, and such indicators may be a distraction.

What is required is an improved means and method of allowing the vehicle driver to become accustomed to a change of engine torque characteristic in response to a propulsion request when a mode change takes place.

It is against this background that the present invention has been conceived. Aspects and embodiments of the invention may provide a method, a system or a vehicle which address or obviate the above problems. Other aims and advantages of the invention will become apparent from the following description, claims and drawings.

SUMMARY OF THE INVENTION

According to one aspect of the invention for which protection is sought there is provided a method of blending between different filters of a propulsion request associated with the motor of a vehicle whereby a propulsion request is more delayed or less delayed according to the operating mode of the vehicle, the method comprising the steps of:
 detecting a current operating mode of the vehicle and applying a source filter appropriate to the current operating mode to a propulsion request,
 detecting a change of operating mode of the vehicle and selecting a target filter appropriate to the changed operating mode for a propulsion request, and
 blending from the source filter to the target filter over time so as to progressively change the delay applied to a propulsion request.

Aspects of the present invention thus provide for a progressive change of filter map over the period for which one of said filters provides a relative delay, so that the driver experiences a progressive change between source and target propulsion request filters rather than a step change.

One of the source filter and target filter may define a map which gives a substantially instant response of the vehicle powertrain such as an engine thereof to a change in accelerator pedal position P. The other of the source and target filter may modify this map to more or less delay the response of the vehicle powertrain, for example the engine, typically by applying a time constant to the characteristic. The time constant may be close to zero for the substantially instant response. Blending between maps having different time constants, and thus different delay characteristics is within the scope of embodiments of the present invention.

Said filter may be a time constant, and said method may include the step of applying said time constant to a characteristic of accelerator pedal position P and engine output torque T to define a source map. Where a vehicle is an electric vehicle, it is to be understood that the time constant may be applied to a characteristic of accelerator pedal position P and electric propulsion motor output torque T to define a source map. In the case of a hybrid vehicle, it is to be understood that the time constant may apply to characteristic of accelerator pedal position P and a net drive torque output by an engine and one or more electric propulsion motors at a given moment in time, depending on which device is generating output torque to drive the vehicle. Where the present discussion refers to an engine, it is to be understood that the discussion is equally applicable to any suitable propulsion device or propulsion source, which may include a plurality of different devices as in the case of a hybrid vehicle.

Said filter may be a time constant, and said method may include the step of applying said time constant to a characteristic of accelerator pedal position P and output torque T to define a target map.

Said time constant may be applied to a characteristic relating accelerator pedal position P to an electrical output signal, whereby a change of said output signal is representative of the propulsion request. The output signal may be employed by an electronic control unit to determine an amount of torque to be demanded of a source of propulsion.

The method may further include the step of blending progressively from said source map to said target map.

The method may further include the step of blending progressively at a fixed rate.

The method may include the step of blending from the source map to the target map at a percentage per unit time of the difference between said maps.

It is to be understood that reference to percentage of a quantity is considered equivalent to reference to a proportion of that quantity, in contrast with an absolute value. Thus, reference to a 'percentage per unit time' of a difference between maps or between characteristics, such as 10% per unit time of the difference, is considered equivalent to 'proportion per unit time' of the difference, in contrast with an absolute value being a fixed quantity that is independent of the difference, for example a fixed quantity of 7 Nm per unit time.

The method may include the step of detecting a propulsion request and selecting a percentage completion of blending from the source filter (map) to the target filter (map) according to completion of a blend of output torque characteristics associated with different operating modes of the vehicle.

The method may include the step of continually determining a percentage of completion of blending of the source fitter map to the target filter map whilst blending of output torque characteristics associated with different operating modes of the vehicle is in progress.

Said percentage completion of blending may be continually determined at a frequency of 1 Hz or greater, optionally 10 Hz or greater.

The method may include the step of detecting a subsequent propulsion request, and selecting a new percentage completion of blending from the source filter map to the target filter map according to completion of a blend of output torque characteristics associated with different operating modes of the vehicle. The new percentage of completion of blending from the source filter map to the target filter map may be substantially equal to the percentage of completion of blending of output torque characteristics as a function of accelerator pedal position.

The method may include the step of automatically changing the operating mode of the vehicle according to detection of operating conditions thereof.

Embodiments of the present invention may typically be implemented in an electronic control unit (ECU) of a vehicle, and the relative delay applied to a propulsion request obtained for example by reference to a look-up table or an appropriate algorithm. The relative delay, which may be close to zero, may also be selected according to other factors such as transmission ratio or range, or environmental conditions such as rain. For example, in the case the vehicle is in a driving mode appropriate to travel over grass, the filter characteristic may be adjusted depending on whether the vehicle is travelling over wet grass or dry grass. Thus the filter applied may correspond to a more delayed response in the event that rain is detected whilst travelling in one or more modes appropriate to travel over grass. Other arrangements are also useful.

In one aspect of the invention for which protection is sought there is provided an electronic control system for defining the output of a vehicle propulsion source in relation to the position of an accelerator pedal by reference to a plurality of torque maps held within a memory, the system being operable to perform blending between different filters of a propulsion request associated with the propulsion source of a vehicle whereby a propulsion request is more delayed or less delayed according to the operating mode of the vehicle, the system being operable to:

detect a current operating mode of the vehicle and apply a source filter appropriate to the current operating mode to a propulsion request;

detect a change of operating mode of the vehicle and select a target filter appropriate to the changed operating mode for a propulsion request; and blend from the source filter to the target filter over time so as to progressively change the delay applied to a propulsion request.

The propulsion source may be an engine, an electric motor or any other suitable source.

According to another aspect of the present invention for which protection is sought there is provided an electronic control system for defining the output of a vehicle propulsion source in relation to the position of an accelerator pedal by reference to a plurality of torque maps held within a memory, said system being adapted to detect a first operating mode of the vehicle and apply a source map, to detect a second operating mode and select a target map, to apply a filter to the source map and target map so as to more or less delay the effect of a propulsion request and to blend from the source map to the filtered target map.

The propulsion source may be an engine, an electric motor or any other suitable source.

The control system may include a processor whereby each said filter comprises a time constant selected according to the instant operating mode of the vehicle. The processor may be adapted to progressively vary a source time constant to a target time constant to change the delay associated with said propulsion request.

According to a further aspect of the present invention for which protection is sought, there is provided a vehicle having a plurality of operating modes, each of which comprises a different characteristic of output torque and accelerator pedal position, and a control system according to another aspect of the present invention.

Within the scope of the claims it is expressly intended that the various aspects, embodiments, examples and alternatives set out in the preceding paragraphs and/or in the following description and drawings, and in particular the individual features thereof, may be taken independently or in any combination. For example, features described in connection with one embodiment are applicable to all embodiments unless such features are incompatible.

BRIEF DESCRIPTION OF THE DRAWINGS

Embodiments of the present invention will now be described, by way of example only, with reference to the accompanying drawings in which.

DETAILED DESCRIPTION

FIG. 2 illustrates pedal progression maps of different vehicle operating modes, and demonstrates how in some modes a greater accelerator pedal movement is required in order to achieve a given engine output torque T.

FIG. 3 illustrates for different vehicle operating modes, the filtered response of an advancing accelerator pedal position, and demonstrates how a target torque of FIG. 2 may be reached more or less quickly.

Figure 4:
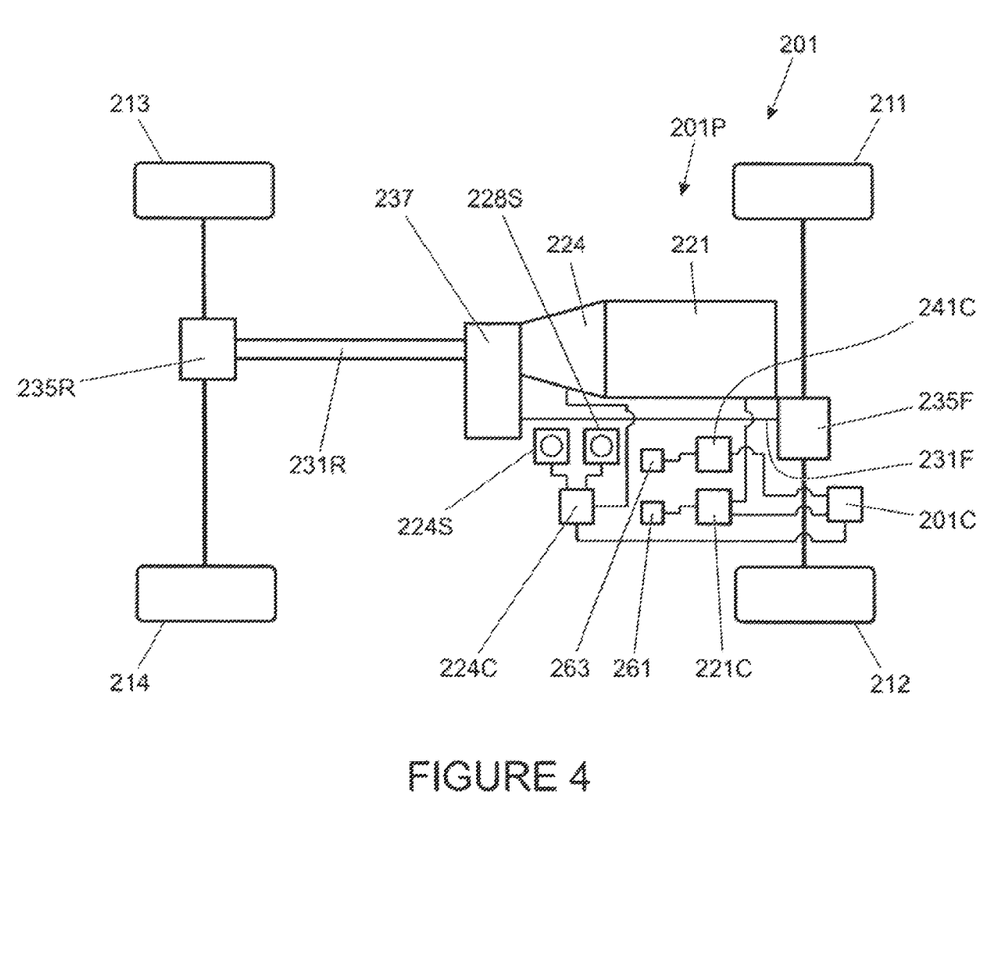
FIG. 4 is a schematic illustration of a motor vehicle according to an embodiment of the present invention.

FIG. 4 is a schematic illustration of a motor vehicle 201 according to an embodiment of the present invention. Like features of the vehicle 201 of FIG. 4 to those of the vehicle 101 of FIG. 1 are shown with like reference numerals prefixed numeral 2 instead of numeral 1. Thus engine 121 of the vehicle 101 of FIG. 1 corresponds to engine 221 of the vehicle 201 of FIG. 4.

The vehicle 201 has a VCU 201C programmed with accelerator pedal progression maps that are used to determine engine torque T as a function of accelerator pedal position P. In the embodiment of FIG. 4 the modes include modes A and B having accelerator pedal progression maps with characteristics A and B, respectively, as described above and illustrated in FIG. 2.

Figure 5:
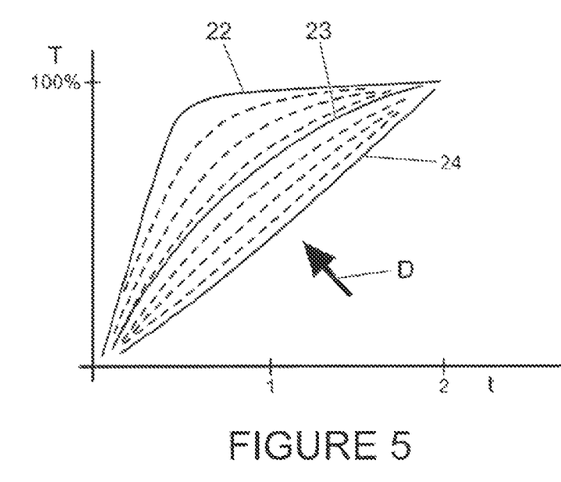
FIG. 5 illustrates progression of blending between different torque maps.

With reference to FIG. 5 the characteristics of FIG. 3 are repeated, and show the rise of engine torque T plotted against time t. An unfiltered response is marked (22), a less filtered response is marked (23) and a more filtered response is marked (24).

In the event of a change of vehicle operating mode whereby for example a more filtered characteristic (24) is blended to an unfiltered characteristic (22) blending is in the direction of arrow D, and the progress of the blend over time is indicated by the intermediate dotted lines.

Thus, according to the present embodiment of the invention, the torque response of the engine 221 progressively changes shape as the blend progresses until blending is complete. A change of accelerator pedal position P whilst blending is in progress causes the engine response to follow the intermediate characteristic, so that the vehicle driver is not presented with a step change of torque output.

Blending is converted into a percentage per unit time value based on the current difference between the source and target characteristics, so as to gradually change the shape of the characteristic throughout the time range associated with the delay in engine response.

Figure 6:
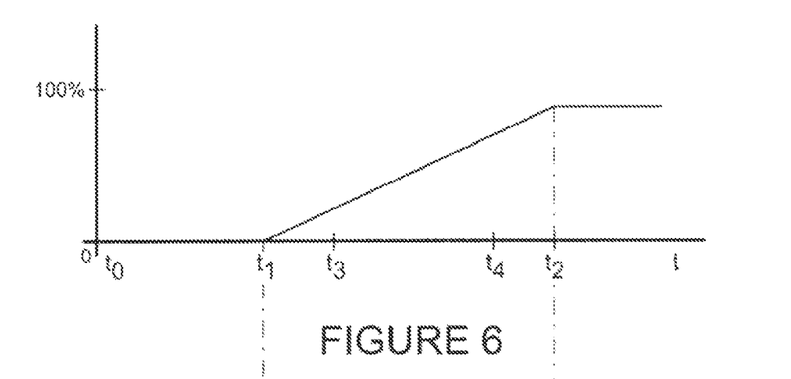
FIG. 6 illustrates linear progression of a torque blend from one vehicle operating mode to another.

With reference to FIG. 6, progression of a torque blend upon mode change of a vehicle 201 is illustrated. From time $t_0$ to $t_1$ a vehicle 201 is in a first operating mode, for example a rock crawl mode. At $t_1$ a mode change is effected, for example to a sand mode, and blending of the pedal progression maps (FIG. 2) commences (in this example at a fixed rate). At $t_2$ blending is complete, and the pedal progression map appropriate to sand is fully implemented.

Figure 7:
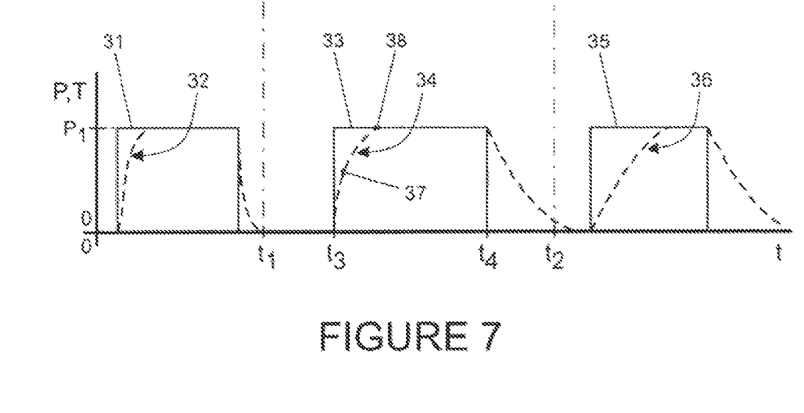
FIG. 7 corresponds to FIG. 6, and illustrates the effect of blending a filtered propulsion request, according to an embodiment of the invention.

FIG. 7 shows the effect of blending from a source mode propulsion request filter (corresponding in this example to a rock crawl mode propulsion request filter) to a target mode propulsion request filter (corresponding in this example to a sand mode propulsion request filter) upon a succession of positive propulsion requests of a vehicle driver over the period of the blend of FIG. 6.

For simplicity each propulsion request is represented by a solid line indicative of both a change of accelerator pedal position P and the consequent change of engine output torque T that would result if no filtering occurred. Furthermore, in this illustration the output torque T that would result if no filtering occurred is identical for each propulsion request even though the vehicle operating mode changes at time t1.

A first propulsion request before time $t_1$ is represented by solid line 31; the vehicle is in rock crawl mode, and accordingly the propulsion request is filtered according to the rock crawl propulsion request filter for the case of an increase in demanded torque, the output being represented by dotted line 32. The rock crawl propulsion request filter is arranged to ensure that engine torque rises rapidly to the maximum requested value. The propulsion request ceases before $t_1$, whereupon the engine output torque falls rapidly, according to the rock crawl propulsion request filter for the case of a reduction in demanded torque.

A second propulsion request represented by line 33 occurs at $t_3$, after a mode change has been effected and whilst blending of the pedal progression maps from the source mode map to the target mode map is in progress. In this example, at the time of the second propulsion request blending between pedal progression maps of the source and target modes is approximately 30% complete.

After $t_2$, when blending of the pedal progression maps is complete, a third propulsion request represented by line 35 occurs; the vehicle is in sand mode, and accordingly the propulsion request is filtered according to the sand mode propulsion request filter for the case of an increase in demanded torque. The resulting engine output torque T is illustrated by dotted line 36. The sand mode propulsion request filter is arranged to ensure that the rise of engine torque is significantly moderated compared with the unfiltered demand (line 35) in order to reduce the risk of losing traction. The sand mode propulsion request filter is substantially unmodified at this stage compared to the filter characteristic employed at time $t_3$ whilst blending was in progress. When the propulsion request ceases, engine output torque T falls according to the sand mode propulsion request filter for the case of a decrease in demanded torque. It can be seen from FIG. 7 that the amount of torque T decreases at a much slower rate than for rock crawl mode.

As illustrated in FIG. 7, the second propulsion request (line 33) is filtered by an intermediate amount, so that the instant rise in engine torque T is less fast than the characteristic represented by line 32, but faster than the characteristic represented by line 36.

The modified (intermediate) characteristic represented by line 34 thus represents a blend of the source and target propulsion request filter characteristics, and may for example be based upon the degree of completion of the blend of accelerator pedal position P/engine output torque T (pedal progression) maps at the time of the propulsion request. Thus in this example the intermediate filter characteristic applied may correspond to the source propulsion request filter characteristic for an increase in torque T (represented by line 32) advanced toward the target propulsion request filter characteristic for an increase in torque T (represented by line 36) by 30% of the difference between the characteristics (32,36) at time $t_3$, 30% being the degree of completion of the blend at $t_3$. This characteristic may be applied substantially for the entire process of blending from the source to the target propulsion request filter characteristics, without further modification thereof.

The characteristics (32,36) are typically retained in a look-up memory associated with vehicle operating modes, and the intermediate characteristic is generated, in this example, by adding 30% of the instant difference to the initial characteristic (31) over a sufficient number of small time intervals until engine torque T corresponds to that indicated by the instant accelerator pedal position P/engine torque T map. The blended characteristic may for example have an update frequency of 100 Hz, i.e. the time intervals may correspond to around 0.01 s. Other values are also useful.

In an alternative embodiment, at each small time interval (such as 0.01 s or any other suitable interval), a check is made of the degree of completion of the blend of accelerator pedal position P/engine output torque T maps, and the filter is progressively modified. Thus at the commencement of the second propulsion request (33), the filter is adjusted by the percentage completion of the blend represented in FIG. 6, namely about 30%. At about half-way through the rise of filtered torque, corresponding to point 37, the percentage completion of the blend of pedal progression maps is about 35%, and this value is applied to the difference between the source and target characteristics 32, 36 to generate the instant value of intermediate propulsion request filter characteristic 34.

The propulsion request filter characteristic associated with a given vehicle operating mode may be associated with a time constant, which can be used to modify the unfiltered torque request. To apply a single filter, at each small time interval, the current torque is compared with the requested torque, and the requested torque is modified by the time constant, to produce a filtered response. Once the current torque is within a predetermined amount from the requested torque, the requested torque value is adopted as the current torque and no further filtering is required. On blending between two filters, at each time interval, either the time constant applied may be a result of a blend of the two appropriate time constants, or the filtered torques for each appropriate time constant may be blended. The blend amount may be fixed as in the first embodiment above, according to the percentage of blend between pedal progression maps which has occurred at the start of the propulsion request. Alternatively, as in the alternative embodiment above, at each small time interval (or any desired interval), a check may be made of the degree of completion of the blend of pedal progression maps, so that the degree of blend of the filters is progressively modified. The degree of blending may therefore be modified at a changing rate according to this alternative embodiment. Furthermore, in this embodiment, at each time interval calculation, the system is required to know only the current torque output, the target or requested torque output, and the degree of completion of the blend of pedal progression maps, in order to calculate the next torque output. No knowledge of the torque output history, such as when a propulsion request began, is required.

In the example illustrated in FIG. 7, completion of the rise of filtered torque occurs at point 38. Point 38 corresponds closely to about 40% completion of the blend of pedal progression maps, and this value is applied to generate the instant value of characteristic 34.

It is to be understood that a faster or slower completion of the blend of pedal progression maps will result in a corresponding change in the progression of the filtered response of engine torque T to a propulsion request. Where the blend of pedal progression maps is not linear (in contrast to the example illustrated in FIG. 6) the progression of the filtered response will correspond in a non-linear manner.

At $t_4$, the positive propulsion request ceases, i.e. a negative propulsion request occurs. Accordingly the fall in engine output torque T is filtered so that it is less sudden compared with the source filter characteristic 32, and is for example adjusted by an amount corresponding to the amount by which completion of the blend of FIG. 6 has taken place at $t_4$, namely 80%.

As illustrated, the fall in torque is not completed until after $t_2$, so the final portion of the falling characteristic is equal to 100% of the characteristic appropriate to the target mode (sand mode).

Figure 8:
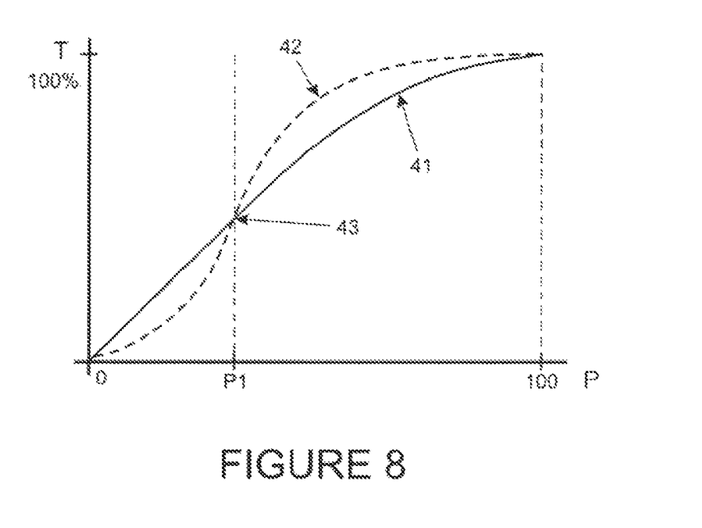
FIG. 8 illustrates engine torque maps appropriate to the filtered response of FIG. 7.

The illustration of FIG. 7 shows an identical target of output engine torque T at each propulsion request. This simulates a change of operating mode in which two different accelerator pedal progression maps meet at an intermediate advancement P of the accelerator pedal—so that the target torque after the mode change is completed is the same as that before mode change is initiated. Crossing pedal progression maps are illustrated in FIG. 8 for two different vehicle operating conditions corresponding to different vehicle modes, represented by lines 41 and 42 respectively. The repeated change in accelerator pedal position P illustrated in FIG. 7 corresponds to a variation in accelerator pedal position x between P=0 and P=P1. It can be seen that at the cross-over point of the lines 41 and 42 (point 43 of FIG. 8), corresponding to accelerator pedal position P1, the engine torque T is substantially the same for each mode.

In most cases, the target torque after a mode change has been effected will be different from the target torque before the mode change commenced, and in the example of FIG. 2, the pedal progression maps do not coincide between 0 and 100% movement of the accelerator pedal. In consequence the blend in response to a propulsion request is more complex, but follows the principles outlined above.

Figure 9:
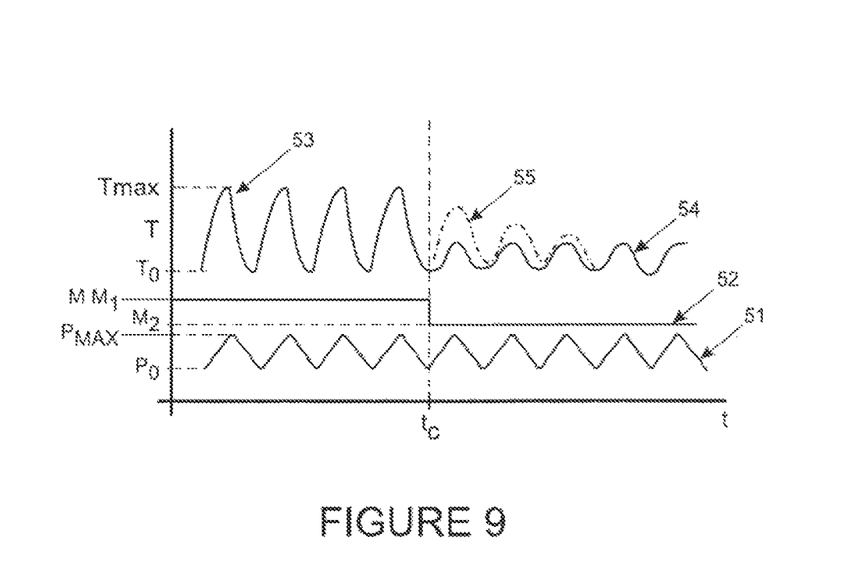
FIG. 9 illustrates the effect on engine output torque of blending a filtered propulsion request.

The effect of blending between filters applied to a propulsion request is illustrated further in FIG. 9. For the purposes of illustration, accelerator pedal position P is illustrated as varying in a more or less continual on/off cycle in a substantially sawtooth manner between P=0% and P=100%. Accelerator pedal position P is represented by line 51 in FIG. 9. The engine 221 of the vehicle 201 is therefore subject to repeating positive and negative propulsion requests.

Vehicle operating mode (M) is represented by line 52, and FIG. 9 illustrates that the vehicle 201 operates in a first TR mode (mode M1, for example rock crawl mode) up to time $t_0$, and a second TR mode (mode M2, for example sand mode) thereafter.

Torque output T from the engine in the rock crawl mode changes rapidly between minimum (T0) and maximum (Tmax) because each propulsion request is relatively unfiltered. Thus the trace of output torque 53 is relatively spiky, and this corresponds to driver expectation and need.

Torque output from the engine 221 in sand mode exhibits a more gradual change because each propulsion request is filtered to prevent spikes of engine torque T (either increasing or decreasing). Line 54 of FIG. 9 shows the corresponding variation in engine output torque T as a function of time with the vehicle in a steady state condition of the sand mode, for a similar variation in accelerator pedal position P as a function of time. It can be seen that the trace of output torque 54 is wave-like with rounded peaks and troughs.

It is to be understood that an intended effect of embodiments of the present invention is the avoidance of a step change between traces 53 and 54 in response to an automatic change of vehicle operating mode at time $t_0$. According to the present embodiment of the invention, the filter applied to a propulsion request is blended, so as to follow a trace indicated by the chain-dot trace 55, to the intent that blending is completed within a finite period of, for example a few seconds (in the illustrated example, three cycles). Blending of the filter typically may take less than five seconds, and in one embodiment between 1.5 and 2.5 seconds.

It is to be understood that even if the target torque (defined by the operating mode of the vehicle 201) is the same for both modes illustrated in FIG. 9, this torque may not in fact be reached before the engine 221 is required to respond to a negative propulsion request. Thus, as illustrated in FIG. 9, the maximum torque reached after time $t_0$ is less than that before $t_0$, and this is due to insufficient time to reach the target torque. Alternatively, if the target torques are different for each mode, the fact that the maximum torque reached after time $t_0$ is less than that reached before time $t_0$ may be at least in part because the target torque in the second mode is less than that in the first mode.

Alternate implementation strategies are possible.

In one embodiment, the control signal indicative of accelerator pedal position (typically a voltage from a potentiometer) is subject to a filter associated with the operating mode of the vehicle. The filter may be expressed numerically, and directly modify the output of accelerator position in the manner of a dashpot, so as to more or less reduce the rate of change of the output. The modified output (typically a voltage) provides a control input to an engine controller 221C in the form of an electronic control unit for controlling the vehicle engine 221. The engine controller 221C is arranged to command engine output torque T according to the selected accelerator pedal progression map stored in the controller 221C, the accelerator pedal progression map to be employed being selected by the VCU 201 (which determines vehicle operating mode). It is to be understood that according to this alternative embodiment, a further controller may be provided in order to perform the filter operation. The further controller may be arranged to receive a signal indicative of vehicle operating mode and to provide a filtered electrical output to an electronic control unit such as an engine controller 221 or vehicle controller VCU 201C, the filtered output taking into account the current operating mode. The further controller may determine current vehicle operating mode for example by reference to one or more signals transmitted on a controller area network (CAN) bus. A signal indicative of currently selected mode may be broadcast on the CAN bus, for example by a VCU 201C.

In the present embodiment illustrated in FIG. 4, the control signal (typically a voltage) indicative of accelerator pedal position P is provided in unmodified form to the engine controller 121C, and the output signal commanding an engine output torque is filtered to more or less reduce the rate of change thereof by the controller 121C. In some embodiments filtering may be performed by the VCU 201C. Other arrangements are also useful.

Embodiments of the present invention have the advantage that a driver is unlikely to be surprised by a change response of a vehicle 201 to changes in accelerator pedal position following a mode change implemented automatically by the VCU 201C (as opposed to a change implemented in response to a user command to change mode). This is because, according to some embodiments of the invention, the response characteristic of an engine 221 to changes in accelerator pedal position P is a blend of the source and target mode propulsion request filter characteristics.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of blending between different filters of a propulsion request associated with the motor of a vehicle whereby a response to a propulsion request is more delayed or less delayed according to the operating mode of the vehicle, the method comprising:
    detecting a current operating mode of the vehicle and applying a source filter appropriate to the current operating mode to a propulsion request, wherein the source filter represents a first delay in the response of a powertrain of the vehicle to the propulsion request and delays the moment in time at which the propulsion request is acted on by the powertrain,
    detecting a change of operating mode of the vehicle and selecting a target filter appropriate to the changed operating mode for a propulsion request, wherein the target filter represents a second delay in the response of the vehicle powertrain to the propulsion request and delays the moment in time at which the propulsion request is acted on by the powertrain, blending from the source filter to the target filter over time while in the changed operating mode so as to progressively change the delay applied to a propulsion request from the first delay to the second delay, and controlling a change in an output torque of the vehicle motor in response to the propulsion request and in accordance with the blending from the source filter to the target filter.

2. A method according to claim 1, wherein said source filter is a first time constant, and said method includes the step of applying said first time constant to a characteristic of accelerator pedal position and output torque to define a source map.

3. A method according to claim 2, wherein said target filter is a second time constant, and said method includes the step of applying said second time constant to a characteristic of accelerator pedal position and output torque to define a target map.

4. A method according to claim 3, wherein said first time constant and said second time constant are applied to a characteristic relating accelerator pedal position to an electrical output signal, whereby a change of said output signal is representative of the propulsion request.

5. A method according to claim 3, wherein the step of blending includes the step of blending over time so as to progressively change from said source map to said target map.

6. A method according to claim 1, and including the step of blending progressively at a fixed rate.

7. A method according to claim 1, and including the step of blending at a percentage per unit time of the difference between said maps.

8. A method according to claim 1, and including the step of detecting a propulsion request of the vehicle and selecting a percentage completion of blending from one of the source filter to the target filter and the source map to the target map, as appropriate, according to completion of a blend of output torque characteristics associated with the change in operating modes of the vehicle.

9. A method according to claim 8, and including the step of substantially continually determining a percentage completion of blending from one of the source filter to the target filter and the source map to the target map, as appropriate, whilst blending of output torque characteristics is in progress.

10. A method according to claim 9, wherein said percentage completion of blending is substantially continually determined at a frequency of 10 Hz or greater.

11. A method according to claim 8, and including the step of detecting a subsequent propulsion request, and selecting a new percentage completion of blending from one of the source filter to the target filter and the source map to the target map, as appropriate, according to completion of a blend of output torque characteristics associated with different operating modes of the vehicle.

12. A method according to claim 1, and including the step of automatically changing the operating mode of the vehicle according to detection of operating conditions thereof.

13. A method according to claim 1, comprising providing the output torque by means of at least one selected from amongst an engine and an electric machine.

14. A control system comprising a processor for defining the propulsion applied to a vehicle by controlling blending between different filters of a propulsion request associated with a motor of a vehicle whereby a response to a propulsion request is more delayed or less delayed according to the operating mode of the vehicle, said processor being programmed to detect a current operating mode of the vehicle and apply a source filter appropriate to the current operating mode to a propulsion request, wherein the source filter represents a first delay in the response of a powertrain of the vehicle to the propulsion request and delays the moment in time at which the propulsion request is acted on by the powertrain; detect a changed operating mode of the vehicle and select a target filter appropriate to the changed operating mode for a propulsion request, wherein the target filter represents a second delay in the response of the vehicle powertrain to the propulsion request and delays the moment in time at which the propulsion request is acted on by the powertrain; blend from the source filter to the target filter over time while in the changed operating mode so as to progressively change the delay applied to a propulsion request from the first delay to the second delay; and control a change in an output torque of the vehicle motor in response to the propulsion request and in accordance with the blending from the source filter to the target filter.

15. A control system according to claim 14, whereby each said filter comprises a time constant selected according to the instant operating mode of the vehicle.

16. A control system according to claim 15 wherein said processor is programmed to progressively vary a source time constant to a target time constant to change the delay associated with said propulsion request.

17. A vehicle having a plurality of operating modes, each of which comprises a different characteristic of output torque and accelerator pedal position, and a control system as defined in claim 14.

18. A vehicle according to claim 17 wherein the output torque is generated by at least one selected from amongst an engine and an electric machine.

19. A method according to claim 1, further comprising the step of operating the vehicle by applying the blended source and target filters to a propulsion request.

* * * * *